T858010

BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JANUARY 7, 1969

858 O.G. 43

720,073

PROCESS CONTROL FOR POLYCARBONAMIDE MELT POLYMERIZATION

Donald David Bly, Wilmington, Del., assignor to E. I. du Pont de Nemours and Company, Wilmington, Del., a corporation of Delaware Filed Apr. 10, 1968. Published Jan. 7, 1969
Class 260—78
2 Sheets Drawing. 23 Pages Specification The invention concerns improvements in the preparation of a high molecular weight polycarbonamide obtained by melt polymerization of a water-insoluble nylon salt, prepared by reacting at least one dicarboxylic acid and at least one diamine. In accordance with the invention the stoichiometry of the said salt is adjusted to the desired molecular proportions prior to polymerization by changing the relative concentrations of the said diamine and said dicarboxylic acid as indicated by stoichiometric analysis of a homogeneous solution of at least about 1.0% by weight of said salt in a solvent comprising a mixture of about 60 to about 90% by volume of the said solvent of ethylene glycol and about 40 to about 10% by volume of the said solvent of a chlorinated hydrocarbon having the formula $H_{4-x}—C—Cl_x$ where $x$ is 2 or 3.

United States Patent Office

PTO - BOYERS, PA Duty Station

MISSING PAGE TEMPORARY NOTICE

PATENT # T858010 FOR ISSUE DATE 1-07-1969

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

Drawing Sheets 1 & 2

N/A at Boyers

6/1/94

Data Conversion Operation

Boyers, Pa